US008897588B2

(12) United States Patent
Wang et al.

(10) Patent No.: US 8,897,588 B2
(45) Date of Patent: Nov. 25, 2014

(54) DATA-DRIVEN EDGE-BASED IMAGE DE-BLURRING

(71) Applicant: Adobe Systems Incorporated, San Jose, CA (US)

(72) Inventors: Jue Wang, Seattle, WA (US); Sunghyun Cho, Seattle, WA (US); Libin Sun, Providence, RI (US)

(73) Assignee: Adobe Systems Incorporated, San Jose, CA (US)

( * ) Notice: Subject to any disclaimer, the term of this patent is extended or adjusted under 35 U.S.C. 154(b) by 74 days.

(21) Appl. No.: 13/682,201

(22) Filed: Nov. 20, 2012

(65) Prior Publication Data

US 2014/0140633 A1    May 22, 2014

(51) Int. Cl.
G06K 9/36    (2006.01)
G06K 9/40    (2006.01)

(52) U.S. Cl.
CPC ........................................ G06K 9/40 (2013.01)
USPC .......................................................... 382/255

(58) Field of Classification Search
CPC .... G06K 9/036; G06K 9/6277; G06T 1/0028; G06T 1/005; G06T 7/0002
See application file for complete search history.

(56) References Cited

U.S. PATENT DOCUMENTS

| | | |
|---|---|---|
| 5,671,283 A | 9/1997 | Michener et al. |
| 5,689,587 A * | 11/1997 | Bender et al. .................. 382/232 |
| 5,870,499 A * | 2/1999 | Bender et al. .................. 382/232 |
| 6,122,375 A | 9/2000 | Takaragi et al. |
| 6,266,412 B1 | 7/2001 | Berenzweig et al. |
| 6,333,983 B1 | 12/2001 | Enichen |
| 6,370,247 B1 | 4/2002 | Takaragi et al. |
| 6,480,957 B1 | 11/2002 | Liao et al. |
| 6,778,667 B1 | 8/2004 | Bakhle et al. |
| 6,804,355 B1 | 10/2004 | Graunke |
| 7,003,107 B2 | 2/2006 | Ananth |
| 7,103,181 B2 | 9/2006 | Ananth |
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,269,664 B2 | 9/2007 | Hutsch et al. |
| 7,269,854 B2 | 9/2007 | Simmons et al. |
| 7,350,070 B2 | 3/2008 | Smathers et al. |

(Continued)

FOREIGN PATENT DOCUMENTS

WO    WO-2010086317    8/2010

OTHER PUBLICATIONS

Non-Final Office Action, U.S. Appl. No. 13/309,982, (Jan. 17, 2013), 32 pages.

(Continued)

Primary Examiner — Jose Couso
(74) Attorney, Agent, or Firm — Wolfe-SBMC

(57) ABSTRACT

An image de-blurring system obtains a blurred input image and generates, based on the blurred input image, a blur kernel. The blur kernel is an indication of how the image capture device was moved and/or how the subject captured in the image moved during image capture, resulting in blur. Based on the blur kernel and the blurred input image, a de-blurred image is generated. The blur kernel is generated based on sharp versions of the blurred input image predicted using a data-driven approach based on a collection of prior edges.

20 Claims, 9 Drawing Sheets

(56) References Cited

U.S. PATENT DOCUMENTS

| | | | |
|---|---|---|---|
| 7,412,060 B2 | 8/2008 | Fukuda | |
| 7,418,100 B2 | 8/2008 | McGrew et al. | |
| 7,536,016 B2 | 5/2009 | Benaloh | |
| 7,636,691 B2 | 12/2009 | Maari | |
| 7,680,269 B2 | 3/2010 | Nicolai et al. | |
| 7,693,278 B2 | 4/2010 | Hiramatsu | |
| 7,757,299 B2 | 7/2010 | Robert et al. | |
| 7,827,408 B1 | 11/2010 | Gehringer | |
| 7,836,311 B2 | 11/2010 | Kuriya et al. | |
| 7,861,312 B2 | 12/2010 | Lee et al. | |
| 7,884,854 B2 | 2/2011 | Banner et al. | |
| 8,051,287 B2 | 11/2011 | Shetty et al. | |
| 8,082,592 B2 | 12/2011 | Harris | |
| 8,095,795 B2 | 1/2012 | Levy | |
| 8,099,519 B2 | 1/2012 | Ueda | |
| 8,130,952 B2 | 3/2012 | Shamoon et al. | |
| 8,184,182 B2 | 5/2012 | Lee et al. | |
| 8,189,769 B2 | 5/2012 | Ramasamy et al. | |
| 8,245,033 B1 | 8/2012 | Shetty et al. | |
| 8,300,812 B2 | 10/2012 | Van De Ven | |
| 8,428,390 B2 | 4/2013 | Li et al. | |
| 8,520,083 B2 | 8/2013 | Webster et al. | |
| 8,594,385 B2 * | 11/2013 | Marchesotti et al. | 382/112 |
| 2002/0154779 A1 | 10/2002 | Asano et al. | |
| 2004/0030656 A1 | 2/2004 | Kambayashi et al. | |
| 2005/0015343 A1 | 1/2005 | Nagai et al. | |
| 2006/0173846 A1 | 8/2006 | Omae et al. | |
| 2008/0120230 A1 | 5/2008 | Lebegue et al. | |
| 2009/0125726 A1 | 5/2009 | Iyer et al. | |
| 2009/0276628 A1 | 11/2009 | Cho et al. | |
| 2009/0279697 A1 | 11/2009 | Schneider | |
| 2009/0290710 A1 | 11/2009 | Tkachenko et al. | |
| 2009/0307489 A1 | 12/2009 | Endoh | |
| 2009/0315670 A1 | 12/2009 | Naressi et al. | |
| 2010/0105454 A1 | 4/2010 | Weber | |
| 2010/0153747 A1 | 6/2010 | Asnaashari et al. | |
| 2010/0246816 A1 | 9/2010 | Thomas et al. | |
| 2010/0257368 A1 | 10/2010 | Yuen | |
| 2010/0279766 A1 | 11/2010 | Pliska et al. | |
| 2011/0161669 A1 | 6/2011 | Eto | |
| 2012/0042167 A1 | 2/2012 | Marking et al. | |
| 2012/0173865 A1 | 7/2012 | Swaminathan | |
| 2012/0173880 A1 | 7/2012 | Swaminathan | |
| 2012/0216300 A1 | 8/2012 | Vivolo et al. | |
| 2014/0023291 A1 | 1/2014 | Lin | |
| 2014/0140626 A1 | 5/2014 | Cho | |

OTHER PUBLICATIONS

Non-Final Office Action, U.S. Appl. No. 13/310,032, (Jan. 3, 2013),18 pages.
"Time Domain Pitch Scaling using Synchronous Overlap and Add", retrieved from <http://homepages.inspire.net.nz/~jamckinnon/report/sola.htm> on Nov. 12, 2012, 3 pages.
"Waveform Similarity Based Overlap-Add (WSOLA)", retrieved from <http://www.pjsip.org/pjmedia/docs/html/group_PJMED_WSOLA.htm> on Nov. 12, 2012, 4 pages.
Aodha, et al., "Patch Based Synthesis for Single Depth Image Super-Resolution", Retrieved from <http://visual.cs.ucl.ac.uk/ext/depthSuperRes/eccv2012_draft.pdf> on Nov. 28, 2012, 14 pages.
Arbelaez, et al., "Contour Detection and Hierarchical Image Segmentation", Retrieved from <http://www.cs.berkeley.edu/~arbelaez/publications/amfm_pami2011.pdf> on Nov. 28, 2012, (2011), 20 pages.
Buades, et al., "A non-local algorithm for image denoising", Retrieved from <http://bengal.missouri.edu/~kes25c/nl2.pdf > on Nov. 28, 2012, (2005), 6 pages.
Cho, et al., "A Content-Aware Image Prior", Retrieved from <http://people.csail.mit.edu/taegsang/Documents/ContentAwarePrior_CVPR2010.pdf> on Nov. 28, 2012, 8 pages.
Cho, et al., "Blur Kernel Estimation using the Radon Transform", Retrieved from <http://people.csail.mit.edu/taegsang/Documents/RadonTransform_CVPR2011.pdf> on Nov. 28, 2012, 8 pages.

Cho, et al., "Fast Motion Deblurring", *Proceedings of ACM Transactions on Graphics*, vol. 28, Issue 5, (Dec. 2009), 8 pages.
Cho, et al., "Image restoration by matching gradient distributions", Retrieved from <http://research.microsoft.com/en-us/um/people/larryz/choimagerestoration.pdf>, (2011), 13 pages.
Couzinie-Devy, et al., "Dictionary Learning for Deblurring and Digital Zoom", Retrieved from <http://hal.inria.fr/docs/00/62/74/02/PDF/manuscript.pdf> on Nov. 28, 2012, (Sep. 28, 2011), 14 pages.
De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos235/Bernardini.pdf> on Nov. 12, 2012, (Dec. 7, 2000), 7 pages.
Dolson, Mark "The Phase Vocoder: A Tutorial", retrieved from <http://www.panix.com/~jens/pvoc-dolson.par> on Nov. 12, 2012, 11 pages.
Efros, et al., "Texture Synthesis by Non-parametric Sampling", Retrieved from <http://www.google.com/url?sa=t&rct=j&g=&esrc=s&source=web&cd=1&ved=0CDgQFjAA&url=http%3A%2F%2Fciteseerx.ist.psu.edu%2Fviewdoc%2Fdownload%3Fdoi%3D10.1.1.87.5386%26rep%3Drep1%26type%3Dpdf&ei=vee_UPHcDcjligKYv4GoBw&usg=AFQjCNFzcgUrhWMQAWsicicD, (Sep. 1999), 6 pages.
Fergus, et al., "Removing Camera Shake from a Single Photograph", Retrieved from <http://people.csail.mit.edu/fergus/papers/deblur_fergus.pdf> on Nov. 28, 2012, (2006), 8 pages.
Gutierrez-Osuna, Ricardo "L19: Prosodic Modificatin of Speech", Lecture based on [Taylor, 2009, ch. 14; Holmes, 2001, ch. 5; Moulines and Charpentier, 1990], retrieved from <http://research.cs.tamu.edu/prism/lectures/sp/l19.pdf> on Nov. 12, 2012, 35 pages.
Hacohen, et al., "Image Upsampling via Texture Hallucination", Retrieved from <http://www.cs.huji.ac.il/~yoavhacohen/upsampling/upsampling.pdf> on Nov. 28, 2012, (Mar. 2010), 8 pages.
He, et al., "Corner detector based on global and local curvature properties", Retrieved from <http://hub.hku.hk/bitstream/10722/57246/1/142282.pdf> on Dec. 21, 2012, (May 2008), 13 pages.
Hirsch, et al., "Fast Removal of Non-uniform Camera Shake", Retrieved from <http://webdav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf> on Nov. 21, 2012, 8 pages.
Joshi, et al., "PSF Estimation using Sharp Edge Prediction", Retrieved from <http://www.google.com/url?sa=t&rct=j&g=&esrc=s&source=web&cd=1&ved=0CDAQFjAA&url=http%3A%2F%2Fciteseerx.ist.psu.edu%2Fviewdoc%2Fdownload%3Fdoi%3D10.1.1.210.4003%26rep%3Drep1%26type%3Dpdf&ei=UyK1UN-9MO_viQLb4oHQBQ&usg=AFQjCNHzEiFnMyeN9UJuiKh, CVPR,(2008),8 pages.
Klingbeil, Michael "SPEAR: Sinusoidal Partial Editing Analysis and Resynthesis", retrieved from <http://www.klingbeil.com/spear/> on Nov. 12, 2012, 3 pages.
Krishnan, et al., "Blind Deconvolution Using a Normalized Sparsity Measure", Retrieved from <http://cs.nyu.edu/~dilip/wordpress/papers/priors_cvpr11.pdf> on Nov. 28, 2012, 8 pages.
Krishnan, et al., "Fast Image Deconvolution using Hyper-Laplacian Priors", Retrieved from <http://www.cs.nyu.edu/~fergus/papers/fid_nips09.pdf> on Nov. 28, 2012, (2009), 9 pages.
Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, (1998), pp. 337-344.
Kwatra, et al., "Texture Optimization for Example-based Synthesis", Retrieved from <http://physbam.stanford.edu/~kwatra/papers/TO/TO-final.pdf> on Nov. 28, 2012, (2005), 8 pages.

(56) References Cited

OTHER PUBLICATIONS

Levin, et al., "Efficient Marginal Likelihood Optimization in Blind Deconvolution", Retrieved from <http://www.wisdom.weizmann.ac.il/~levina/papers/deconvLevinEtalCVPR11.pdf> on Nov. 28, 2012, (Apr. 4, 2011), 8 pages.

Levin, et al., "Image and Depth from a Conventional Camera with a Coded Aperture", *ACM Transactions on Graphics, SIGGRAPH 2007 Conference Proceedings, San Diego, CA*, Retrieved from <http://groups.csail.mit.edu/graphics/CodedAperture/CodedAperture-LevinEtAl-SIGGRAPH07.pdf> on Dec. 21, 2012,(2007), 9 pages.

Levin, et al., "Understanding and evaluating blind deconvolution algorithms", Retrieved from < http://www.wisdom.weizmann.ac.il/~levina/papers/deconvLevinEtalCVPR09.pdf>, (2009), 8 pages.

Mairal, et al., "Non-local Sparse Models for Image Restoration", Retrieved from <http://www.di.ens.fr/~fbach/iccv09/_mairal.pdf> on Nov. 28, 2012, 8 pages.

Marr, D. "Vision: A computational investigation into the human representation and processing of visual information.", *New York: WH Freeman*, (1982), 6 pages.

McAulay, R. J., et al., "Speech Processing Based on a Sinusoidal Model", *The Lincoln Laboratory Journal*, vol. 1, No. 2, 1998, Retrieved from <http://www.ll.mit.edu/publications/journal/pdf/vol01_no2/1.2.3.speechprocessing.pdf> on Nov. 12, 2012,(1988), pp. 153-168.

Moinet, Alexis et al., "PVSOLA: A Phase Vocoder with Synchronized Overlap-Add", *Proc. of the 14th Int. Conference on Digital Audio Effects (DAFx-11), Paris, France*, Sep. 19-23, 2011, retreived from <http://tcts.fpms.ac.be/publications/papers/2011/dafx2011_pvsola_amtd.pdf> on Nov. 12, 2012,(Sep. 19, 2011), 7 pages.

Ni, et al., "Example-Driven Manifold Priors For Image Deconvolution", Retrieved from <http://www.public.asu.edu/~pturaga/papers/Manifold_deconv_final_doublecolumn.pdf> on Nov. 28, 2012, 11 pages.

Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.

Portilla, et al., "A Parametric Texture Model Based on Joint Statistics of Complex Wavelet Coefficients", Retrieved from <https://redwood.berkeley.edu/bruno/public/papers/portilla99-reprint.pdf> on Nov. 28, 2012, (Jun. 9, 2000), 23 pages.

Rodet, Xavier "Musical Sound Signal Analysis/Synthesis: Sinusoidal+Residual and Elementary Waveform Models", *TFTS'97 (IEEE Time-Frequency and Time-Scale Workshop 97), Coventry, Grande Bretagne, août*, 1997, retrieved from <http://articles.ircam.fr/textes/Rodet97e/index.html> on Nov. 12, 2012,(1997),16 pages.

Roelands, Marc et al., "Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.

Roth, et al., "Fields of Experts", Retrieved from <http://www.cs.brown.edu/~black/Papers/rothIJCV09.pdf> on Nov. 28, 2012, (Nov. 17, 2008), 25 pages.

Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.

Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages.

Serra, Xavier "Musical Sound Modeling with Sinusoids Plus Noise", published in C. Roads, S. Pope, A. Picialli, G. De Poli, editors. 1997. *"Musical Signal Processing"*. Swets & Zeitlinger Publishers, retrieved from <http://web.media.mit.edu/~tristan/Classes/MAS.945/Papers/Technical/Serra_SMS_97.pdf> on Nov. 12, 2012,(1997), 25 pages.

Shan, et al., "High-quality Motion Deblurring from a Single Image", Retrieved from <http://www.google.com/url?sa=t&rct=j&q=&esrc=s&source=web&cd=2&ved=0CEMQFjAB&url=http%3A%2F%2Fciteseerx.ist.psu.edu%2Fviewdoc%2Fdownload%3Fdoi%3D10.1.1.218.6835%26rep%3Drep1%26type%3Dpdf&ei=yjm1UIT6O4iLiAKTooCoAQ&usg=AFQjCNGjzsbOGrl-6NYlkUK, ACM Trans. Graphics, 27(3):73:1-73:10,(Aug. 2008), 10 pages.

Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012), 15 pages.

Sun, et al., "Image Hallucination with Primal Sketch Priors", Retrieved from <http://www.google.com/url?sa=t&rct=j&q=&esrc=s&source=web&cd=1&ved=0CDUQFjAA&url=http%3A%2F%2Fciteseerx.ist.psu.edu%2Fviewdoc%2Fdownload%3Fdoi%3D10.1.1.83.3473%26rep%3Drep1%26type%3Dpdf&ei=MzqlUJCBNYeCjAKM-YCADA&usg=AFQjCNEFVscHa2GKU0OEr9rg, (2003),8 pages.

Sun, et al., "Super-resolution from Internet-scale Scene Matching", Retrieved from <http://www.cs.brown.edu/people/lbsun/SRproj2012/SR_iccp2012.pdf> on Nov. 28, 2012, 12 pages.

Upperman, Gina "Changing Pitch with PSOLA for Voice Conversion", retrieved from <http://cnx.org/content/m12474/latest/?collection=col10379/1.1> on Nov. 12, 2012, 1 page.

Verhelst, Werner "Overlap-Add Methods for Time-Scaling of Speech", retrieved from <http://citeseerx.ist.psu.edu/viewdoc/summar?doi=10.1.1.128.7991> on Nov. 12, 2012, 25 pages.

Verhelst, Werner et al., "An Overlap-Add Technique Based on Waveform Similarity (WSOLA) for High Quality Time-Scale Modification of Speech", retrieved from <http://citeseerx.ist.psu.edu/viewdoc/download?doi=10.1.1.202.4560&rep=rep1&type=pdf> on Nov. 12, 2012, 4 pages.

Weiss, "What makes a good model of natural images?", Retrieved from <http://people.csail.mit.edu/billf/papers/foe-final.pdf> on Nov. 28, 2012, 8 pages.

Xu, et al., "Two-Phase Kernel Estimation for Robust Motion Deblurring", Retrieved from <http://www.google.com/url?sa=t&rct=j&q=&esrc=s&source=web&cd=1&ved=0CDgQFjAA&url=http%3A%2F%2Fciteseerx.ist.psu.edu%2Fviewdoc%2Fdownload%3Fdoi%3D10.1.1.170.6990%26rep%3Drep1%26type%3Dpdf&ei=z0C1UNT6EsSfiAKkm4HgDA&usg=AFQjCNExeYfpnDxf6vY-tvU, Proceedings ECCV 2010,(2010),14 pages.

Yang, et al., "Image Super-Resolution as Sparse Representation of Raw Image Patches", Retrieved from <http://www.ifp.illinois.edu/~jyang29/papers/CVPR08-SR.pdf> on Nov. 28, 2012, 8 pages.

Yuan, et al., "Image Deblurring with Blurred/Noisy Image Pairs", *Proceedings of ACM SIGGRAPH*, vol. 26, Issue 3, (Jul. 2007),10 pages.

Zhang, "Close the Loop: Joint Blind Image Restoration and Recognition with Sparse Representation Prior", Retrieved from <http://www.ifp.illinois.edu/~jyang29/papers/JRR_ICCV11.pdf> on Nov. 28, 2012, 8 pages.

Zhu, et al., "Nonparametric Bayesian Texture Learning and Synthesis", Retrieved from <http://people.csail.mit.edu/leozhu/paper/texturelearning09.pdf> on Nov. 28, 2012, 9 pages.

Zoran, et al., "From Learning Models of Natural Image Patches to Whole Image Restoration", Retrieved from <http://www.cs.huji.ac.il/~daniez/EPLLICCVCameraReady.pdf> on Nov. 28, 2012, 8 pages.

Non-Final Office Action, U.S. Appl. No. 13/680,952, Aug. 4, 2014, 8 pages.

\* cited by examiner

900

DATA-DRIVEN EDGE-BASED IMAGE DE-BLURRING

BACKGROUND

As digital imaging technology has advanced, the use of digital cameras has expanded to where digital imaging can be found not only in dedicated cameras but also in various other devices such as computers, wireless phones, and so forth. While this advance in digital imaging technology has made it easier for users to take pictures using a variety of different devices, problems still remain. One such problem is that image blurring can still occur, oftentimes caused by movement of the camera while capturing the image. Such image blurring can result in frustrating user experiences as the picture the user intended to capture is not as sharp as the user was expecting or desired.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, an input image having multiple patches that each includes multiple pixels is obtained. For each of the multiple patches in the input image, a sharp patch including a sharp edge is identified. Each sharp patch is one of multiple sharp patches in a sharp patch library. Based on the identified sharp patches, a predicted sharp version of the input image is generated from which a de-blurred version of the input image can be generated.

In accordance with one or more aspects, an input image is obtained. Given the input image, predicted sharp versions of images and blur kernels are iteratively generated. The predicted sharp versions of the images are generated based on sharp patches corresponding to patches of the images. These sharp patches are included in a sharp patch library. The blur kernels are generated based on the predicted sharp versions of the images, and a sharpened version of the image can be generated from one of the blur kernels.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Data-driven edge-based image de-blurring is discussed herein. An image de-blurring system obtains a blurred input image and generates, based on the blurred input image, a blur kernel. The blur kernel is an indication of how the image capture device was moved (and/or how the subject captured in the image moved) during image capture, resulting in blur. Given the blur kernel and the blurred input image, a de-blurred version of the blurred input image is generated.

The techniques described herein obtain this blur kernel by iteratively generating a blur kernel and an intermediate sharpened version of the blurred input image. In each iteration, edges are extracted from an image (the blurred input image or an intermediate sharpened version of the image from a previous iteration), a blur kernel is generated, and an intermediate sharpened version of the image is generated. To generate the blur kernel in each iteration, a predicted sharp version of the image is generated by coercing or modifying the edges in the predicted sharp version of the image to be close to or similar to prior sharp edges included in patches maintained in a sharp patch library. The predicted sharp version of the image is then used to generate the blur kernel, resulting in a blur kernel generated based on the collection of prior sharp edges included in the patches of the sharp patch library. The blur kernel as generated in the last iteration is used to generate the de-blurred version of the blurred input image.

Figure 1:
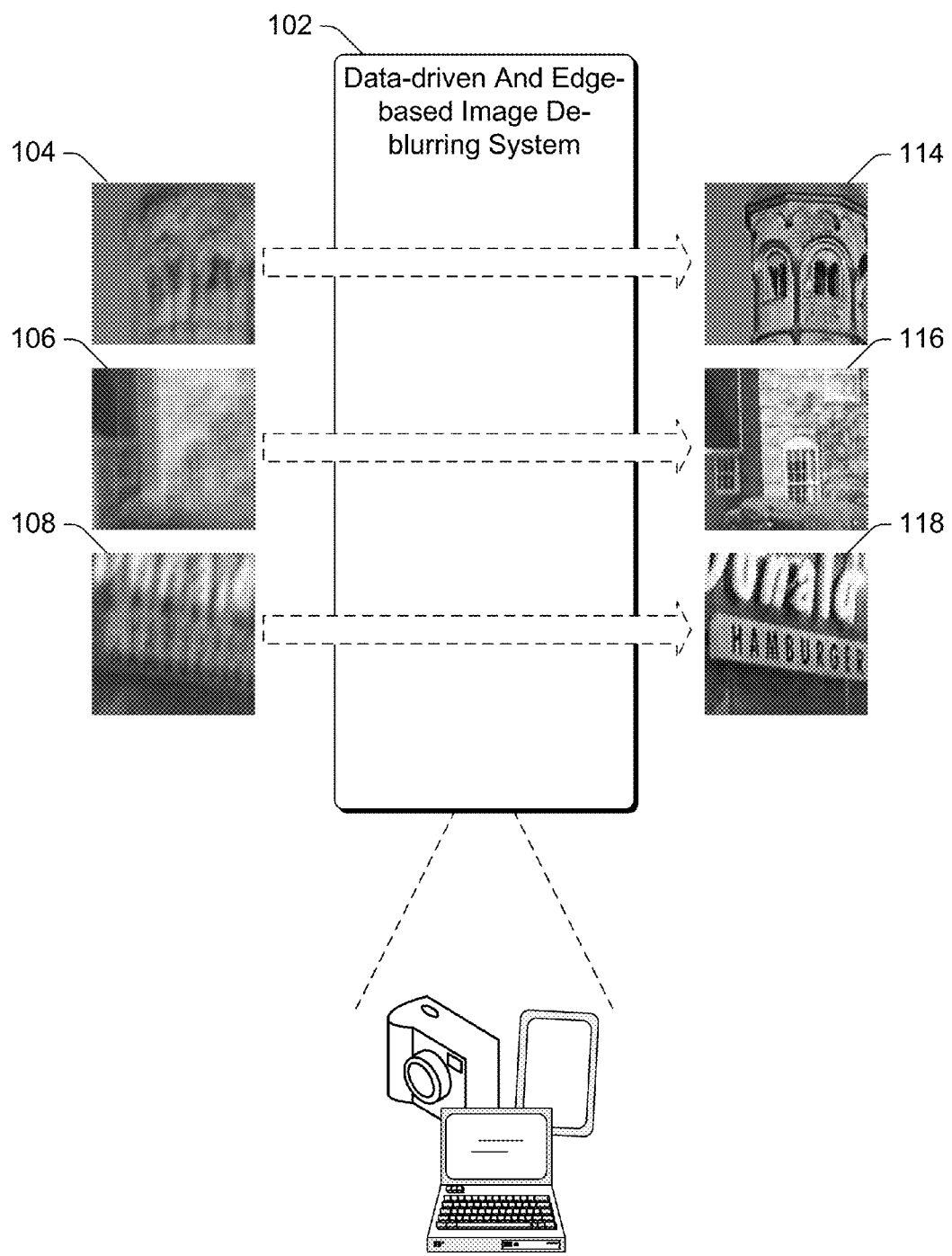
FIG. 1 is a block diagram illustrating an example system implementing the data-driven edge-based image de-blurring in accordance with one or more embodiments.

FIG. 1 is a block diagram illustrating an example data-driven and edge-based image de-blurring system 102 implementing the data-driven edge-based image de-blurring in accordance with one or more embodiments. System 102 can be implemented by one or more of a variety of different types of devices that can edit or process images, also referred to as image processing devices. For example, system 102 can be implemented by a desktop computer, a server computer, a laptop or netbook computer, a tablet or notepad computer, a set-top box communicatively coupled to a display device, a television or other display device, a cellular or other wireless phone, a game console, an automotive computer, a digital camera, a scanner or copier, and so forth. System 102 can also be implemented by a virtual device, such as a virtual machine running on a physical device. A virtual machine can be run on any of a variety of different types of physical devices (e.g., any of the various types listed above). Thus, devices implementing system 102 may range from full resource devices with substantial memory and processor resources (e.g., personal computers, game consoles) to low-resource devices with limited memory and/or processing resources (e.g., digital cameras, mobile devices).

Image de-blurring system 102 processes images to de-blur the images. De-blurring an image refers to reducing the blur present in an image, and is also referred to as sharpening the image. As illustrated in the example of FIG. 1, different blurred input images 104, 106, and 108 can be obtained by system 102, which generates corresponding de-blurred versions of the images 114, 116, and 118, respectively. Image de-blurring system 102 de-blurs images using a data-driven approach based on a collection of prior edges, as discussed in more detail below.

Figure 2:
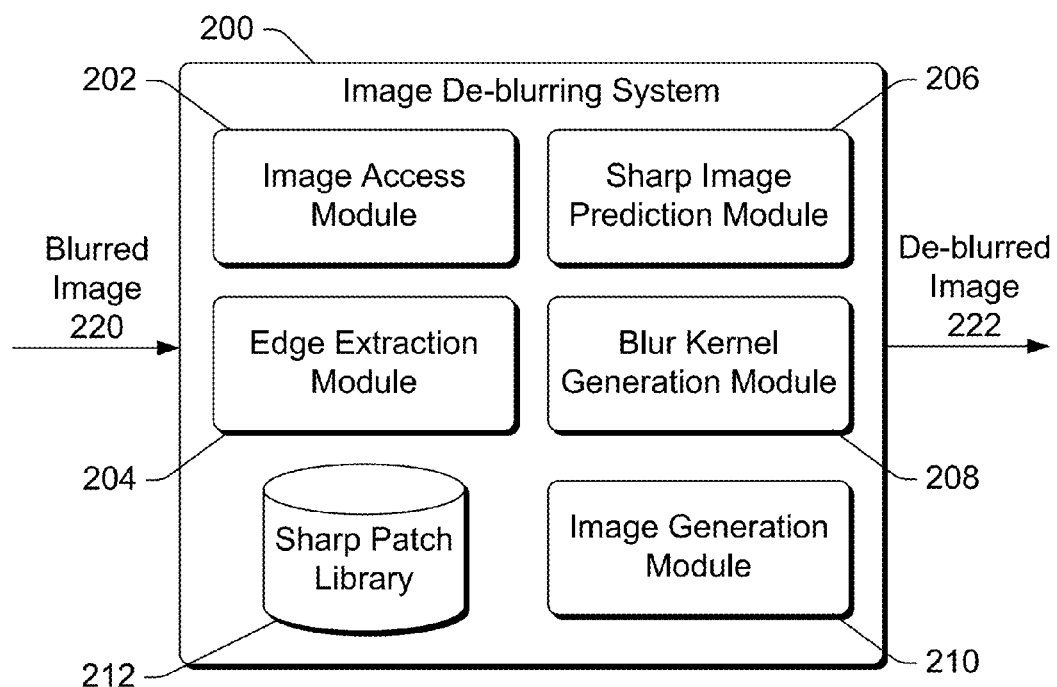
FIG. 2 illustrates an example image de-blurring system in accordance with one or more embodiments.

FIG. 2 illustrates an example image de-blurring system 200 in accordance with one or more embodiments. Image de-blurring system 200 can be, for example, a data-driven and edge-based image de-blurring system 102 of FIG. 1. System 200 includes an image access module 202, an edge extraction module 204, a sharp image prediction module 206, a blur kernel generation module 208, an image generation module 210, and a sharp patch library 212. Although particular functionality is discussed herein with reference to particular modules, it should be noted that the functionality of individual modules discussed herein can be separated into multiple modules, and/or at least some functionality of multiple modules discussed herein can be combined into a single module.

Image access module 202 obtains an image 220, also referred to as an input image, for de-blurring. Image 220 is assumed to typically have blurring, and thus is also referred to as a blurred image. Image access module 202 can obtain image 220 in various manners and from various sources, and can obtain the image from another component of the device implementing system 200 or from a separate device. For example, module 202 can obtain the image from an image capture component, retrieve the image from a storage device coupled to the device implementing system 200, retrieve the image from a storage device accessed via a network, and so forth.

Image de-blurring system 200 generates a de-blurred image from a blurred image based on information obtained from the blurred image itself. System 200 need not have access to metadata or other information describing the image capture process, the image capture device, the subject captured in the image, and so forth. This de-blurring based on information obtained from the blurred image itself is also referred to as single image de-blurring or blind de-convolution.

Image de-blurring system 200 generates, from blurred image 220, a blur kernel based on which de-blurred image 222 is generated. The blur kernel, also referred to as a point spread function (PSF), is an indication of how the image capture device was moved (and/or how the subject captured in the image moved) during image capture, resulting in blur as indicated above. How the image capture device (or subject) was moved refers to a direction of movement and an amount (e.g., distance) of movement.

Generally, image de-blurring system 200 generates de-blurred image 222 by iteratively extracting edges (e.g., by edge extraction module 204) from an image, predicting a sharp version of the image (e.g., by sharp image prediction module 206) based on edges in sharp patches (e.g., in sharp patch library 212), and generating a blur kernel (e.g., by blur kernel generation module 208) based on the predicted sharp image. After the last iteration, the generated blur kernel is used by image generation module 210 to generate de-blurred image 222, which is a de-blurred version of blurred image 220. Module 210 can output the image in various manners, such as displaying the image, storing the image in a storage device, communicating the image to another device for display or storage, communicating the image to another device or component for further processing, and so forth.

Figure 3:
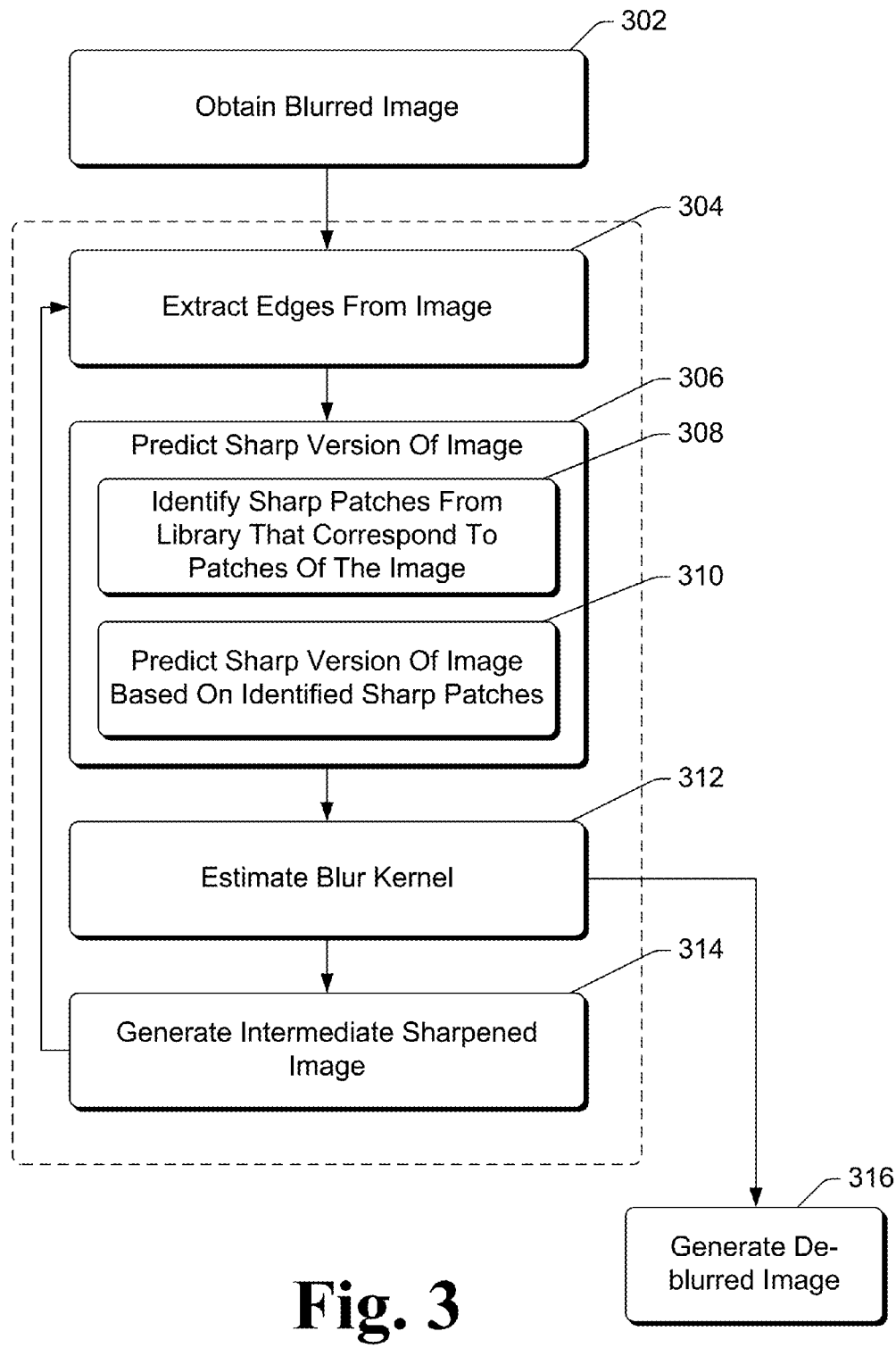
FIG. 3 illustrates an example process for implementing the data-driven edge-based image de-blurring in accordance with one or more embodiments.

FIG. 3 illustrates an example process 300 for implementing the data-driven edge-based image de-blurring in accordance with one or more embodiments. Process 300 is carried out by an image de-blurring system, such as system 102 of FIG. 1 or system 200 of FIG. 2, and can be implemented in software, firmware, hardware, or combinations thereof. Process 300 is shown as a set of acts and is not limited to the order shown for performing the operations of the various acts. Process 300 is an example process for implementing the data-driven edge-based image de-blurring; additional discussions of implementing the data-driven edge-based image de-blurring are included herein with reference to different figures.

Process 300 uses the following model for generating a de-blurred image:

$$B = L \otimes K + N. \quad (1)$$

As used herein, B refers to an input blurred image (e.g., blurred image 220 of FIG. 2), L refers to a latent sharp image (a de-blurred version of the input blurred image, e.g., de-blurred image 222 of FIG. 2), $\otimes$ is the convolution operator, K refers to a blur kernel, and N refers to noise. Using this model, it can be readily seen that using de-convolution, given a blurred image and a blur kernel for the blurred image, a de-blurred version of the blurred image can be readily generated.

In process 300, a blurred image is obtained (act 302). This blurred image is, for example, blurred image 220 obtained by image access module 202 of FIG. 2.

Edges are extracted from the image (act 304). Acts 304-314 of process 300 are repeated in multiple iterations (illustrated by the dashed line in FIG. 3), and the image from which the edges are extracted is the blurred image obtained in act 302 in the first iteration and is an intermediate sharpened image in subsequent iterations. The edges can be extracted using any of a variety of public and/or proprietary techniques, and can be identified in a variety of different manners (e.g., using an edge map). The edges are extracted by, for example, edge extraction module 204 of FIG. 2.

A predicted sharp version of the image is obtained (act 306). The predicted sharp version of the image is generated by, for example, sharp image prediction module 206 of FIG. 2. The predicted sharp version of the image is generated using a data-driven approach based on a collection of prior edges maintained in a sharp patch library, such as sharp patch library 212 of FIG. 2. More specifically, sharp patches (collections of pixels) from a sharp patch library are identified that correspond to patches in the image from which the edges are extracted (act 308). The predicted sharp version of the image is generated based on these identified sharp patches (act 310).

Given the predicted sharp version of the image, a blur kernel is estimated (act 312). The blur kernel is, for example, a blur kernel K of model (1) generated by blur kernel generation module 208 of FIG. 2.

Given the blur kernel estimated in act 312 and the image from which edges are extracted in act 304, an intermediate sharpened version of the image is generated (act 314). The intermediate sharpened version of the image is, for example, a latent sharp image L o model (1) generated by image generation module 210 of FIG. 2. The intermediate sharpened version of the image is then used in the next iteration (the next pass through acts 304-314) as the image in act 304. On the last iteration, given the blur kernel estimated in act 312 and the blurred image obtained in act 302, a de-blurred version of the image is generated (act 316).

In one or more embodiments five or seven iterations of acts 304-314 are performed in process 300. However, it should be noted that alternatively any number of iterations of acts 304-314 can be performed in process 300. Alternatively, rather than having a fixed number of iterations, the acts 304-314 can be repeated until convergence (e.g., the difference between the estimated blur kernel in consecutive iterations is less than a threshold amount).

The acts of FIG. 3 are discussed in additional detail below, with reference to other figures as well. Referring again to act 306, the predicted sharp version of the image is generated based on sharp patches from a sharp patch library, such as sharp patch library 212 of FIG. 2.

Sharp patch library 212 is a database or other record of sharp edges. An edge refers to an edge of a subject in an image (e.g., the outline of a box, building, or other object; the perimeter of features of an object; etc.). A sharp edge refers to a well-defined, non-blurry edge (e.g., a clearly defined or crisp edge as viewed by a user as opposed to a blurry edge). An edge refers to one or more pixels each having a high gradient value (e.g., a gradient value equal to and/or greater than a threshold value). The edges in library 212 are typically determined to be sharp by another module or device, and can be computer-created (synthetic) edges or natural edges (edges from images known or believed to be sharp). Sharp patch library 212 can be populated automatically by another module or device, by image de-blurring system 200, based on input from a user of system 200 or a user of another device or system, and so forth.

Sharp patch library 212 includes multiple patches, each patch typically being a small number of pixels (e.g., 25-50 pixels). The patches are typically square in shape, such as 5×5 pixel patches, 7×7 pixel patches, and so forth. However, it should be noted that other patch sizes can be used (e.g., having any number of pixels) and/or that other non-square patch shapes can be used (e.g., triangles, circles, ovals, freeform shapes, and so forth).

The patches in library 212 each include an edge element (e.g., at least a portion of an edge). The patches can include various combinations of single edges, multiple edges (e.g., corners or curves), edge angles or orientations, and so forth.

The patches used by image de-blurring system 200 can be modeled based on both the contrast and local intensity of the patch as follows:

$$\text{Patch} = \sigma Z + \mu + \epsilon.$$

As used herein, Patch refers to a patch used in generating a de-blurred image, $\sigma$ refers to a contrast of a patch in library 212, Z refers to a patch in library 212, $\mu$ refers to a local intensity, and $\epsilon$ refers to a small error term.

Figure 4:
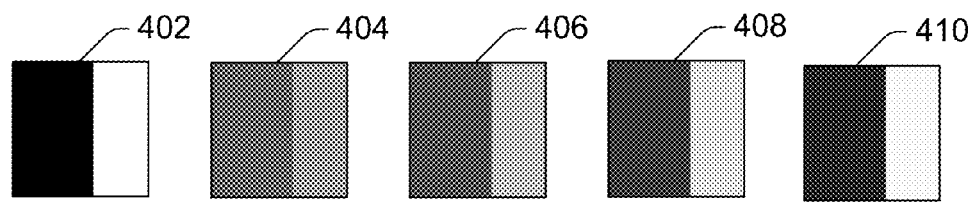
FIG. 4 illustrates an example of patches with different contrast levels in accordance with one or more embodiments.

FIG. 4 illustrates an example of patches with different contrast levels in accordance with one or more embodiments. Five patches 402, 404, 406, 408, and 410 for an example edge are illustrated in FIG. 4. For each of patches 402-410, the local intensity $\mu$ is set to 0.5. Patch 402 illustrates the edge with a contrast level of 0 ($\sigma=0$). Patch 404 illustrates the same edge with a contrast level of 0.1 ($\sigma=0.1$), patch 406 illustrates the same edge with a contrast level of 0.2 ($\sigma=0.2$), patch 408 illustrates the same edge with a contrast level of 0.3 ($\sigma=0.3$), and patch 410 illustrates the same edge with a contrast level of 0.4 ($\sigma=0.4$).

Returning to FIG. 2, sharp patch library 212 includes multiple sharp patches (patches including a sharp edge). Sharp patch library 212 can include one or more patches with synthetically generated sharp edges. Synthetically generated sharp edges refer to computer-created edges rather than edges identified from images. Generally, patches including synthetically generated sharp edges are generated for inclusion in library 212 so that a large amount (e.g., at least a threshold percentage) of likely edges to be encountered in a blurred image are included in library 212.

Figure 5:
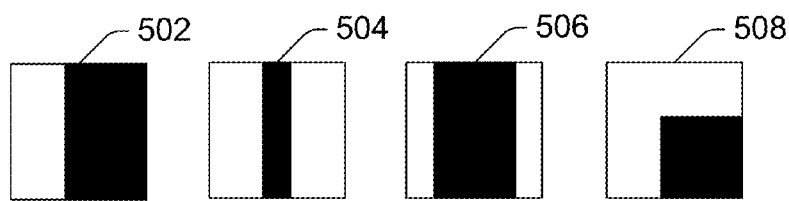
FIG. 5 illustrates an example of seed patches in accordance with one or more embodiments.

In one or more embodiments, synthetically generated sharp edges are generated based on one or more seed patches that are transformed in various manners. FIG. 5 illustrates an example of seed patches in accordance with one or more embodiments. Four seed patches 502, 504, 506, and 508 are illustrated in FIG. 5, although alternatively any number of seed patches can be used. Seed patches 502, 504, and 506 illustrate edges that extend through the patch, and seed patch 508 illustrates an edge that ends in the patch.

A set of patches including synthetically generated sharp edges to include in sharp patch library 212 are generated by performing various transformations on the seed patches. These transformations can include rotations, shifts, and compliments, although other transformations can alternatively be used. The rotation refers to rotating the edges in the seed patches a particular number of degrees (e.g., 3 degrees in intervals from 0 to 180 degrees). The shifting refers to shifting the edge (e.g., illustrated by the shaded portion in the seed patch) a particular number of pixels (e.g., one or two pixels) in a particular direction (e.g., up, down, left, right). The compliment refers to reversing the edge part (e.g., the shaded part) and non-edge part (e.g., the non-shaded part) in the patch. The set of patches is generated by performing multiple combinations of these transformations (e.g., all possible combinations of transformations) on each of the seed patches. Patches in the set of patches that are flat (e.g., include no edge because it was shifted out of the patch) or are identical to another patch in the set can be removed from the set of patches. This can result in generating a set of approximately 8000 patches, although the set of patches can include fewer or greater numbers of patches.

Returning to FIG. 2, in addition to or in place of synthetically generated sharp edges, sharp patch library 212 can include one or more patches with natural sharp edges. Natural sharp edges refer to edges identified from images rather than computer-created edges. Images with known sharp edges (e.g., as identified by another system or device, by a user, and so forth) are the source images from which patches that include the natural sharp edges are selected for inclusion in sharp patch library 212. Generally, patches including natural sharp edges are selected for inclusion in library 212 so that a large amount (e.g., at least a threshold percentage) of likely edges to be encountered in a blurred image are included in library 212.

Figure 6:
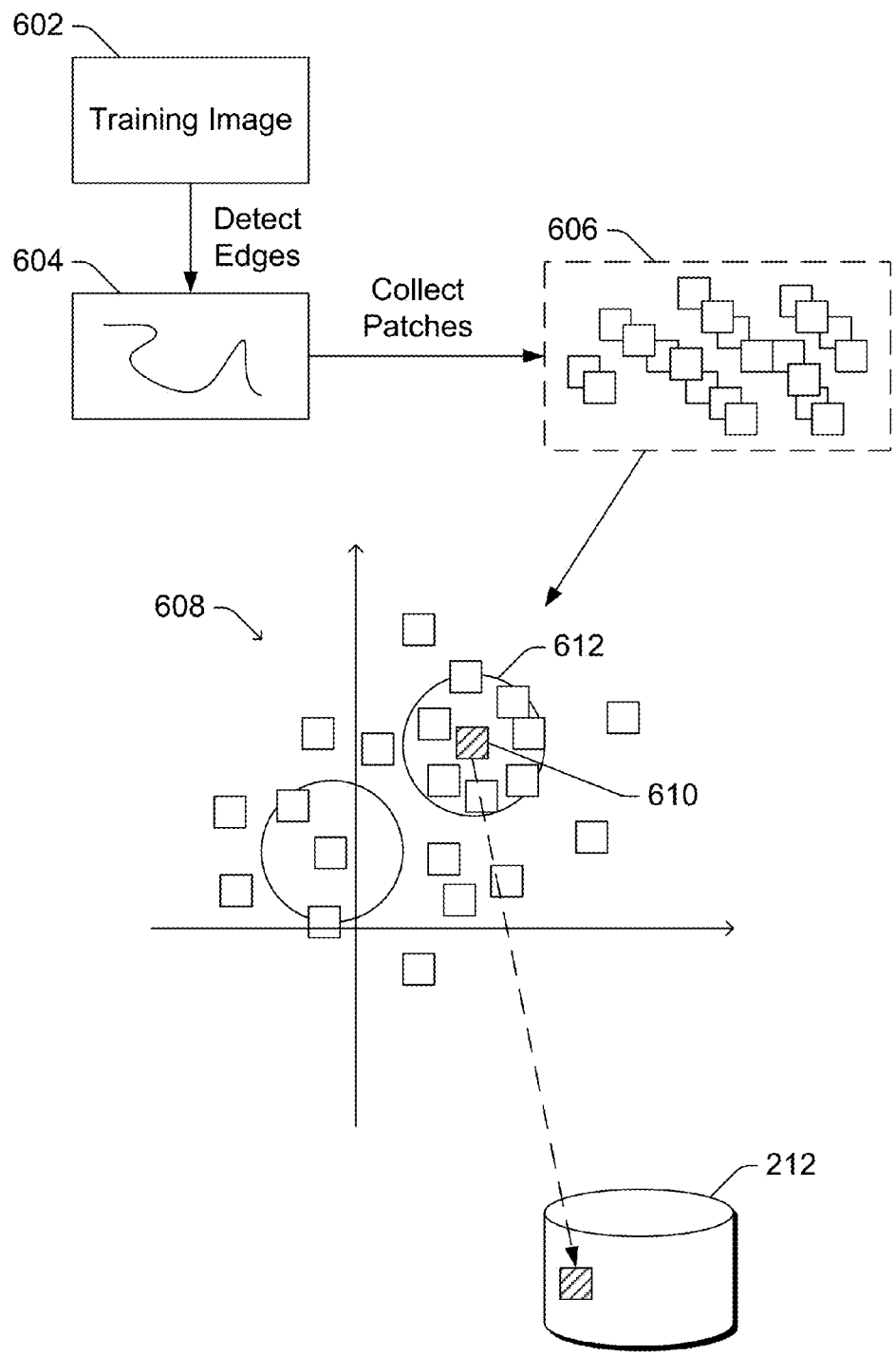
FIG. 6 illustrates an example of obtaining patches with natural sharp edges for inclusion in a sharp patch library in accordance with one or more embodiments.

FIG. 6 illustrates an example of obtaining patches with natural sharp edges for inclusion in a sharp patch library in accordance with one or more embodiments. Natural sharp edges are selected from a training image 602 with known sharp edges. Although a single training image is illustrated in FIG. 6, it is to be appreciated that any number of training images can be used.

Edges 604 in training image 602 are detected using any of a variety of public and/or proprietary techniques. The patches 606 along edges in training image 602 are collected, and a set 608 of a particular number (e.g., 50) of those patches is identified. The mean intensity of these collected patches can optionally be removed. The patches can be identified in different manners, such as randomly or according to various rules or criteria.

One of the identified patches is then chosen, illustrated as patch 610. The one patch can be chosen in different manners, such as being the patch with the largest number of neighbor patches, although other rules or criteria can alternatively be used. The neighbor patches refer to patches within a threshold appearance distance of the chosen patch (e.g., patches having pixel colors within a threshold amount of the chosen patch), which can be determined in various manners such as based on the sum of pixel color differences between the patches, based on the sum of squared differences of pixel colors in the patches, and so forth. The chosen patch is included as a patch selected for inclusion in library 212. Furthermore, the neighbor patches of the chosen patch are turned off or removed from the set of identified patches (the neighbor patches are no longer eligible for selection for inclusion in library 212). The neighbor patches are illustrated as, for example, the patches at least partially within ring 612. This process of choosing an identified patch and removing neighbor patches from the set of identified patches is repeated until at least a threshold number of patches are included in library 212 or no patches remain in the set of identified patches. This process of selecting a patch for inclusion in library 212 can be repeated across multiple images until at least a threshold number of patches are included in library 212. This threshold number of patches can be approximately 8000 patches, although smaller or larger threshold numbers of patches can alternatively be used.

Figure 7:
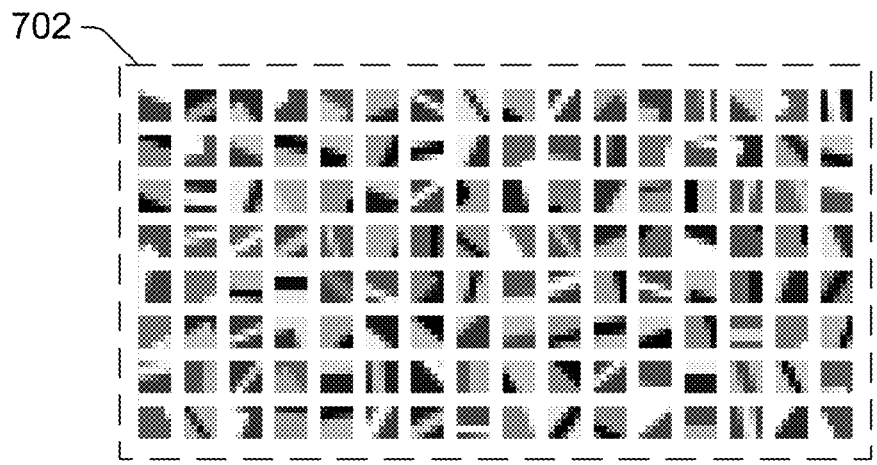
FIGS. 7 and 8 illustrate example patches from a sharp patch library in accordance with one or more embodiments.
Figure 8:
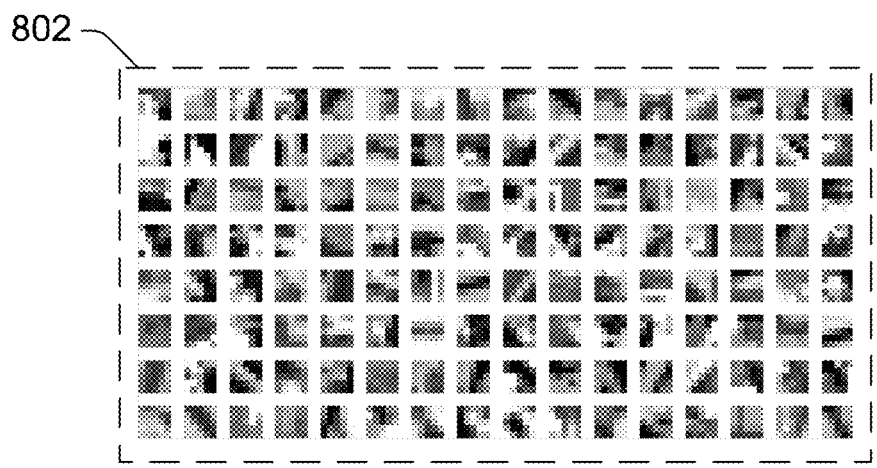

FIGS. 7 and 8 illustrate example patches from a sharp patch library in accordance with one or more embodiments. FIG. 7 illustrates sample patches 702 having various (e.g., randomly chosen) local intensities μ and contrast levels σ. FIG. 8 illustrates sample patches 802 having various (e.g., due to the source images from which the patches are obtained) local intensities μ and contrast levels σ.

Referring again to act 306 of FIG. 3, a predicted sharp version of the image is generated based on the edges extracted in act 304 and the edges in the sharp patch library. Rather than simply filtering the image, the edges in the patches of sharp patch library are used as priors. The edges in the predicted sharp version of the image being generated are coerced or modified to be close to or similar to the sharp edges in the patches of the sharp patch library. These patches of the sharp patch library are used in a patch prior term in generating the predicted sharp version of the image, as discussed in more detail below.

In one or more embodiments, the predicted sharp version of the image (the predicted sharp version being referred to as x below) is generated in act 306 by reducing (e.g., minimizing) an energy function including four terms: a convolution term, a strong edge term, a patch prior term, and a contrast distribution term. The convolution term indicates that the predicted sharp version of the image being generated is to, when convolved with the current estimated blur kernel, be at least approximately the same (e.g., the same or approximately the same) as the input image (e.g., blurred image 220 of FIG. 2). The strong edge term emphasizes edges in the predicted sharp version of the image being generated by reducing portions of the predicted sharp version of the image being generated that are flat (do not include edges) to be zero or close to zero. The patch prior term coerces or modifies the edges in the predicted sharp version of the image being generated to be close to or similar to the sharp edges in the patches of the library (e.g., the sharp patch library). The contrast distribution term keeps the contrast distribution in the predicted sharp version of the image being generated consistent with the contrast distribution of a set of known images.

The patch prior term coerces or modifies the edges in the predicted sharp version of the image being generated to be close to or similar to the sharp edges in the patches of the library by identifying patches of the library that are similar to patches that include edges in the image (the image from which the edges are extracted). A patch of an image being similar to a patch of the library refers to the edges in the two patches being at least approximately the same (e.g., the same or approximately the same). The edges in the two patches are at least approximately the same if the various aspects (e.g., angle or rotation, number of pixels in the edge part, etc.) of the edges in the patches are the same or within a threshold amount of one another. For example, the edges in the two patches are at least approximately the same if the edges have the same angle or rotation (or angles or rotations that are within a threshold number of degrees of one another), the edges have the same number of pixels (or numbers of pixels within a threshold amount of one another) in the edge part (e.g., the shaded part based on the seed patches of FIG. 5), and so forth. A patch of the image corresponds to the patch of the library that includes the edge most similar to the edge in the patch of the image (e.g., the edge in the patch of the image having the same aspects as the edge in the patch of the library, or the edge in the patch of the image having aspects that differ by the smallest amount from the edge in the patch of the library).

In one or more embodiments, the predicted sharp version of the image x is generated by reducing (e.g., minimizing) the following energy function:

$$f_x(x) = \sum_{\delta_*} w_* \|k * \delta_* x - \delta_* y\|^2 + \alpha \|\nabla x\|^2 + \frac{\beta}{|M|} \sum_{i \in M} \|\overline{x^i} - \sigma^i Z^i\|^2 + \gamma KL(q_{\sigma_x}, q_{ref}). \quad (2)$$

As used herein, $\delta^*$ refers to the partial derivative operator in different directions, $w^*$ refers to a scalar weight, $\overline{x^i}$ refers to a zero-mean patch centered at pixel location i in latent image x (the predicted sharp version of the image being generated) after removing its DC (the average intensity value of the pixels in the patch), k refers to the current estimated blur kernel (e.g., which can be a delta function on the first iteration), and y refers to the input image (e.g., blurred image 220). Additionally, M refers to an edge mask identifying (e.g., by having a value of 1) locations in the predicted sharp version of the image being generated that are edges, |M| refers to the number of non-zero elements in M, $Z^i$ refers to the latent example patch in the sharp patch library (e.g., library 212) that is assigned to location i in the latent image x (e.g., that corresponds to the patch centered at pixel location i in the latent image x), and $\sigma^i$ refers to a local contrast of location i. Furthermore, $q_{\sigma_x}$ refers to the empirical distribution of $\{\sigma^i\}$, $q_{ref}$ refers to a reference distribution of the contrast distribution of a set of known images, and KL refers to a function that measures the difference between two distributions. In one or more embodiments, $w^*$ is set to 25 for first derivatives and 12.5 for second derivatives, α gradually decreases from 0.2 to 0.15 over iterations, β is set to 0.005*(1, 2, 4, 8, 16, 32, 64, etc.) over iterations to increase the influence of the patches, and γ is set to 0.01. However, it should be noted that these are example values, and other values of $w^*$, α, β, and γ can alternatively be used.

Energy function (2) includes four terms: a convolution term, a strong edge term, a patch prior term, and a contrast distribution term. The convolution term is:

$$\sum_{\delta_*} w_* \|k * \delta_* x - \delta_* y\|^2.$$

The strong edge term is $\alpha \|\nabla x\|^2$. The patch prior term is:

$$\frac{\beta}{|M|} \sum_{i \in M} \|\overline{x^i} - \sigma^i Z^i\|^2.$$

This patch prior term indicates that each patch along edges in x is to look similar to an example patch in the library (e.g., sharp patch library 212). The contrast distribution term is $\gamma KL(q_{\sigma^i}, q_{ref})$. This contrast distribution term indicates that the local contrast distribution in the predicted sharp version of the image being generated is to be at least approximately the same (e.g., the same or approximately the same) as a reference contrast distribution.

Figure 9:
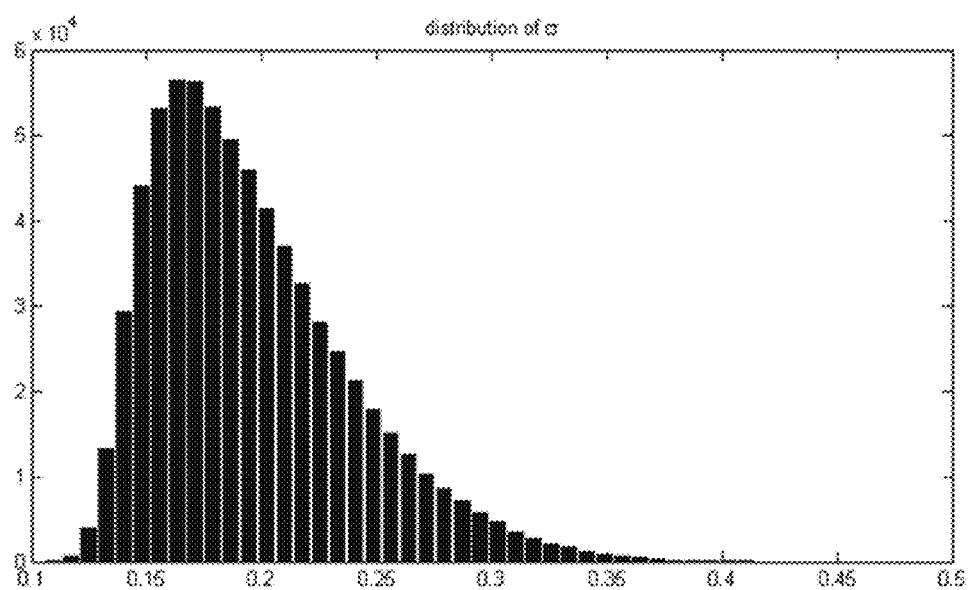
FIG. 9 illustrates a histogram of an example reference contrast distribution in accordance with one or more embodiments.

The reference contrast distribution refers to a contrast distribution of a set of known images. FIG. 9 illustrates a histogram 900 of an example reference contrast distribution $q_{ref}$ in accordance with one or more embodiments. Histogram 900 illustrates contrast values a along the horizontal axis, and a count of pixels having those contrast values along the vertical axis.

Figure 10:
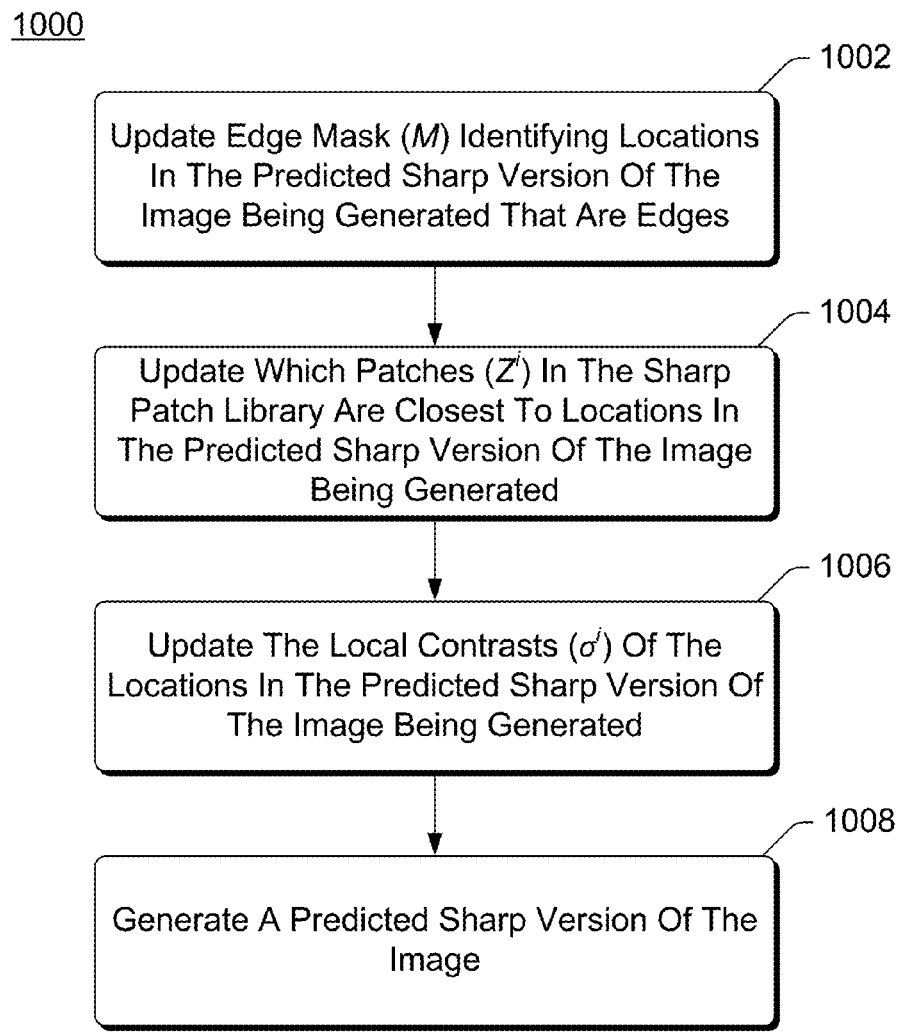
FIG. 10 illustrates an example process for reducing an energy function to generate a predicted sharp version of an image in accordance with one or more embodiments.

FIG. 10 illustrates an example process 1000 for reducing an energy function to generate a predicted sharp version of an image in accordance with one or more embodiments. Process 1000 illustrates an example of reducing the energy function (2). In one or more embodiments, process 1000 implements act 306 of FIG. 3.

In process 1000, the mask M, which identifies locations in the predicted sharp version of the image being generated that are edges as discussed above, is updated (act 1002). The mask M is updated to identify the locations of edges extracted from the image (from the input image 220 in the first iteration or the most recently generated intermediate sharpened image in subsequent iterations).

To update M, the orientated elongated derivative of Gaussian filters (e.g., in 8 orientations) is applied to the gray scale image (e.g., the most recently generated predicted sharp version of the image, or the blurred image if there is not yet a predicted sharp version of the image), resulting in 8 filter responses per pixel and thus 8 channels in the image. The locations with the largest gradients in each channel (e.g., the top 2% locations) are selected and a morphological operator is applied to the selected locations. The morphological operator applies a thinning operation to the selected locations in each channel that thins objects to lines, removing pixels so that an object without holes shrinks to a minimally connected stroke and an object with holes shrinks to a connected ring halfway between each hole and an outer boundary. The morphological operator can be, for example, the mask=bwmorph (mask, 'thin', Inf) operator in Matlab, available from The Mathworks, Inc. of Natick, Mass., although other morphological operators can alternatively be used. The masks for the 8 channels are then combined (e.g., logically OR'd together) to create a combined mask. Connected components in the combined mask are identified and clusters smaller than a threshold size are removed from the combined mask to generate the mask M. This threshold size can be 15 pixels at a top level (e.g., full resolution) and threshold sizes for other levels calculated according to the ratio between resolutions, although other threshold sizes can alternatively be used.

The patches $Z^i$, which are the patches in the sharp patch library that are assigned to locations i in the image as discussed above, are also updated (act 1004). The patches $Z^i$ are updated by holding the value x constant and finding, for each location i, an example patch $Z^i$ that is most similar to:

$$\frac{\vec{x^i}}{\sigma(x^i)}$$

locally, dividing by the standard deviation to normalize the patch. The value $\sigma(x^i)$ refers to the local contrast of the patch $\vec{x^i}$, such as the average or other combination of the local contrasts $\sigma^i$ for each pixel in the patch $\vec{x^i}$.

The local contrasts $\sigma^i$, which are the local contrasts of the locations in the predicted sharp version of the image being generated as discussed above, are also updated (act 1006). The local contrasts $\sigma^i$ are updated as follows. The energy function (2) is reduced (e.g., optimized) with respect to $\sigma$ by keeping the convolution and strong edge terms constant. In one or more embodiments, the local contrasts $\sigma^i$ are updated by obtaining $\hat{\sigma}^j$ for each $\sigma^i$. Each $\hat{\sigma}^j$ value is obtained by performing an inverse lookup from the cumulative distribution function (CDF), also referred to as histogram matching. For each $\sigma_i$, the percentile p of the $\sigma^i$ in its CDF is identified, and the corresponding value $\hat{\sigma}^j$ from the reference distribution $q_{ref}$ at percentile p is identified. The $\sigma^i$ is then solved for as follows:

$$\sigma^i = \arg\min \beta\|\vec{x^i} - \sigma^i Z^i\|^2 + \gamma(\sigma^i - \hat{\sigma}^j)^2$$

where the closed-form solution is:

$$\sigma^i \leftarrow \frac{\frac{\beta}{|M|} Z^{iT}(P_i x - \mu^i) - \gamma \sigma^i_*}{\frac{\beta}{|M|} Z^{iT} Z^i - \gamma}$$

As used herein, $P_i$ refers to a matrix extraction operation that extracts the patch at location i in the image x, and $\mu^i$ refers to the local mean intensity at location i.

After updating the mask M, the patches $Z^i$ for each i, and the local contrast $\sigma^i$, then x (the predicted sharp version of the image being generated) is generated (act 1008). To generate x, the patches $Z^i$ for each location i and the local contrast $\sigma^i$ for each location i are held constant, and module 206 solves for a large linear system. The derivative of the energy function (2) with respect to x is taken and set to zero, resulting in the expression:

$$\left(\sum_{\delta_*} w_* H^T_{k*\delta_*} H_{k*\delta_*} + \alpha \sum_{\delta_x, \delta_y} H^T_\delta H_\delta + \frac{\beta}{|M|} \sum_{i \in M} P^T_i P_i\right) x = \qquad (3)$$

$$\sum_{\delta_*} w_* H^T_{k*\delta_*} H_{\delta_*} y + \frac{\beta}{|M|} \sum_{i \in M} P^T_i (\sigma^i Z^i + \mu^i).$$

As used herein, H, refers to the matrix form of *, $P_i$ refers to a matrix extraction operation that extracts the patch at location i in the image x, $\sigma^i$ refers to the local contrast at location i, and $\mu^i$ refers to the local mean intensity at location i.

Using Fourier transforms, expression (3) can be written as the following expression:

$$\mathcal{F}^{-1}(A \odot \mathcal{F}(x)) + \frac{\beta}{|M|} \sum_{i \in M} P^T_i P_x = \mathcal{F}^{-1}(B) + \frac{\beta}{|M|} \sum_{i \in M} P^T_i (\sigma^i Z^i + \mu^i) \qquad (4)$$

where $$A = \left(\sum_{\delta_*} w_* \overline{\mathcal{F}(\delta_*)} \odot \mathcal{F}(\delta_*)\right) \odot \overline{\mathcal{F}(k)} \odot \mathcal{F}(k) + \alpha \sum_{\delta_x, \delta_y} \overline{\mathcal{F}(\delta_*)} \odot \mathcal{F}(\delta_*) \qquad (5)$$

and

-continued $$B = \left(\sum_{\delta_*} w_* \overline{\mathcal{F}(\delta_*)} \odot \mathcal{F}(\delta_*)\right) \odot \overline{\mathcal{F}(k)} \odot \mathcal{F}(y) \quad (6)$$

As used herein, $\mathcal{F}$ refers to the forward Fourier transform and $\mathcal{F}^{-1}$ refers to the inverse Fourier transform. Expression (4) can be solved in various manners, such as using bi-conjugate gradient descent, where the right-hand side of expression (4) is precomputed after fixing k, Z, and σ, and the left-hand side is computed on-the-fly via a function handle.

Returning to FIG. 3, based on the predicted sharp version of the image generated in act 306, an estimated blur kernel is generated (act 312). In one or more embodiments, the estimated blur kernel is generated by reducing (e.g., optimizing) an energy function that includes two terms: a kernel convolution term and a regularization term. The kernel convolution term indicates that the blur kernel being generated is to, when convolved with the current predicted sharp version of the image, be at least approximately the same (e.g., the same or approximately the same) as the input image (e.g., blurred image 220 of FIG. 2). The regularization term assists in keeping the blur kernel smooth. In one or more embodiments the regularization term is the Tikhonov regularization term, although other regularization terms can alternatively be used.

To generate the estimated blur kernel, x (the predicted sharp version of the image being generated) is held constant and the energy function is reduced (e.g., optimized). The mask M is also held constant, and gradient maps $\{P_x, P_y\}$ are computed. Gradient maps $\{P_x, P_y\}$ identify edges in the image x, and $P_x$ and $P_y$ can be obtained in various manners such as using gradient magnitude thresholding. $P_x$ and $P_y$ are gradient maps of the image x along two directions (e.g., the x and y directions, such as horizontal and vertical directions). Gradient magnitude thresholding selects a gradient magnitude threshold to determine which edges are to be used in generating the blur kernel (e.g., the edges having gradient magnitudes equal to and/or greater than the gradient magnitude threshold).

Gradient magnitude thresholding can be performed in various manners. In one or more embodiments, to estimate an m×m blur kernel, the information of edges in at least m different directions is obtained. The histograms of gradient magnitudes and directions for each edge in the image x are constructed. Angles can be quantized (e.g., by 45 degrees) and gradients of opposite directions counted together. A gradient magnitude threshold is determined that keeps at least rm (e.g., where r is 2) pixels from the largest magnitude for each quantized angle. To include additional gradients values in $\{P_x, P_y\}$ in different iterations, the gradient magnitude threshold can be gradually decreased (e.g., by multiplying in each iteration the gradient magnitude threshold by a value, such as 0.9).

Noisy gradient information is removed, such as by setting P* as follows:

$$P^* \leftarrow P^* \odot M'.$$

As used herein, P* refers to the partial derivative of x, and M' refers to a dilated version of mask M. The dilated version of mask M is generated by expanding or dilating the portions of mask m that indicate an edge (e.g., have a value of one) by a particular radius (e.g., 2). Thus, for example, dilated mask M' identifies, as locations that are edges, each location identified by mask M as being an edge as well as each location within the particular radius (e.g., 2 pixels) of a location identified by mask M as being an edge.

In one or more embodiments, the blur kernel is generated by reducing (e.g., minimizing) the following function:

$$f_k(k) = \sum_{P_*, y_*} w_* \|k * P_* - y_*\|^2 + \theta\|k\|^2. \quad (7)$$

As used herein, y* refers to the partial derivative of y, and θ refers to a weight for Tikhonov regularization (for the Tikhonov regularization term $\theta\|k\|^2$).

Energy function (7) includes two terms: a kernel convolution term and a regularization term. The kernel convolution term is:

$$f_k(k) = \sum_{P_*, y_*} w_* \|k * P_* - y_*\|^2.$$

The regularization term is $\theta\|k\|^2$.

Alternatively, the regularization term in energy function (7) can be changed to account for noise differently. For example, rather than reducing energy function (7), the blur kernel can be generated by reducing (e.g., minimizing) the following energy function:

$$f_k(k) = \sum_{P_*, y_*} w_* \|k * P_* - y_*\|^2 + \theta\|\nabla k\|^2. \quad (8)$$

The energy function (7) can be reduced (e.g., minimized) in various manners. In one or more embodiments, energy function (7) can be written in a matrix form as:

$$f_k(k) = \|Ck - d\|^2 + \theta\|k\|^2, \quad (9)$$

and thus $$f_k(k) = (Ck - d)^T (Ck - d) + \theta k^T k. \quad (10)$$

As used herein, C is a matrix consisting of five P*'s, k is a vector representing the blur kernel k, and d is a vector consisting of five y*'s.

A conjugate gradient method is used to reduce (e.g., minimize) equations (9) and (10), resulting in the gradient $f_k$ as defined by:

$$\frac{\partial f_k(k)}{\partial k} = 2C^T Ck + 2\theta k - 2C^T d \quad (11)$$

being evaluated multiple times during the reducing.

The gradient $f_k$ as defined in equation (11) can be generated using direct computation, or alternatively using fast Fourier transforms (FFTs). Computing Ck uses six FFTs: one forward Fourier $\mathcal{F}(k)$ and five inverse Fourier transforms $\mathcal{F}^{-1} = [w * \mathcal{F}(P^*) \circ \mathcal{F}(k)]$. As used herein, o refers to a pixel-wise multiplication. Similarly, computing $C^T Ck$ can be computing by performing six FFTs. $C^T Ck$ can be computed by:

$$\mathcal{F}^{-1}\left[\sum_{P_*} w_* \overline{\mathcal{F}(P_*)} \cdot \mathcal{F}(P_*) \cdot \mathcal{F}(k)\right] \quad (12)$$

with appropriate cropping and flipping operations. As used herein, $\mathcal{F}\overline{(P^*)}$ refers to the complex conjugate of $\mathcal{F}$ (P*).

It should be noted that energy function (7) uses image derivatives rather than pixel values. Alternatively, pixel values can be used in energy function (7), which results in the computation of Ck with FFTs having boundary artifacts due to the periodicity property of Fourier transforms. In such situations, the boundary artifacts are handled prior to computing Ck. Since energy function (7) uses image derivatives, the boundary artifacts can be avoided by padding the boundaries of the derivative images P*'s with zeroes before computing Ck. This padding can be performed by setting the width of a padded image as a power of prime numbers 2, 3, 5, and 7 that is greater than or equal to (n+m−1), with n and m referring to the widths of the input image and the blur kernel, respectively. The height of the padded image can be determined in an analogous manner.

Referring again to the estimated blur kernel generated in act 312, a sharpened version of the image is generated based on the blurred version of the image and the estimated blur kernel (act 314 or 316). The blurred version of the image in the first iteration and last iteration performed of acts 304-314 is the obtained blurred image (e.g., blurred image 220 of FIG. 2), and in intervening iterations is the intermediate sharpened version of the image generated in act 314 in the previous iteration. In the last iteration, the sharpened version of the image is the de-blurred image in act 316 (e.g., de-blurred image 222 of FIG. 2). In other iterations, the sharpened version of the image is an intermediate sharpened image in act 314 that is used as the input image on subsequent iterations.

In each iteration, a sharpened version of the image is generated (act 314 or 316) based on the model (1) for generating a de-blurred image discussed above:

$$B = L \otimes K + N.$$

Using de-convolution, given the blurred version of the image and the blur kernel generated in act 312, a sharpened version of the image is generated. The de-convolution can be performed using any of a variety of publicly available and/or proprietary techniques.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 11:
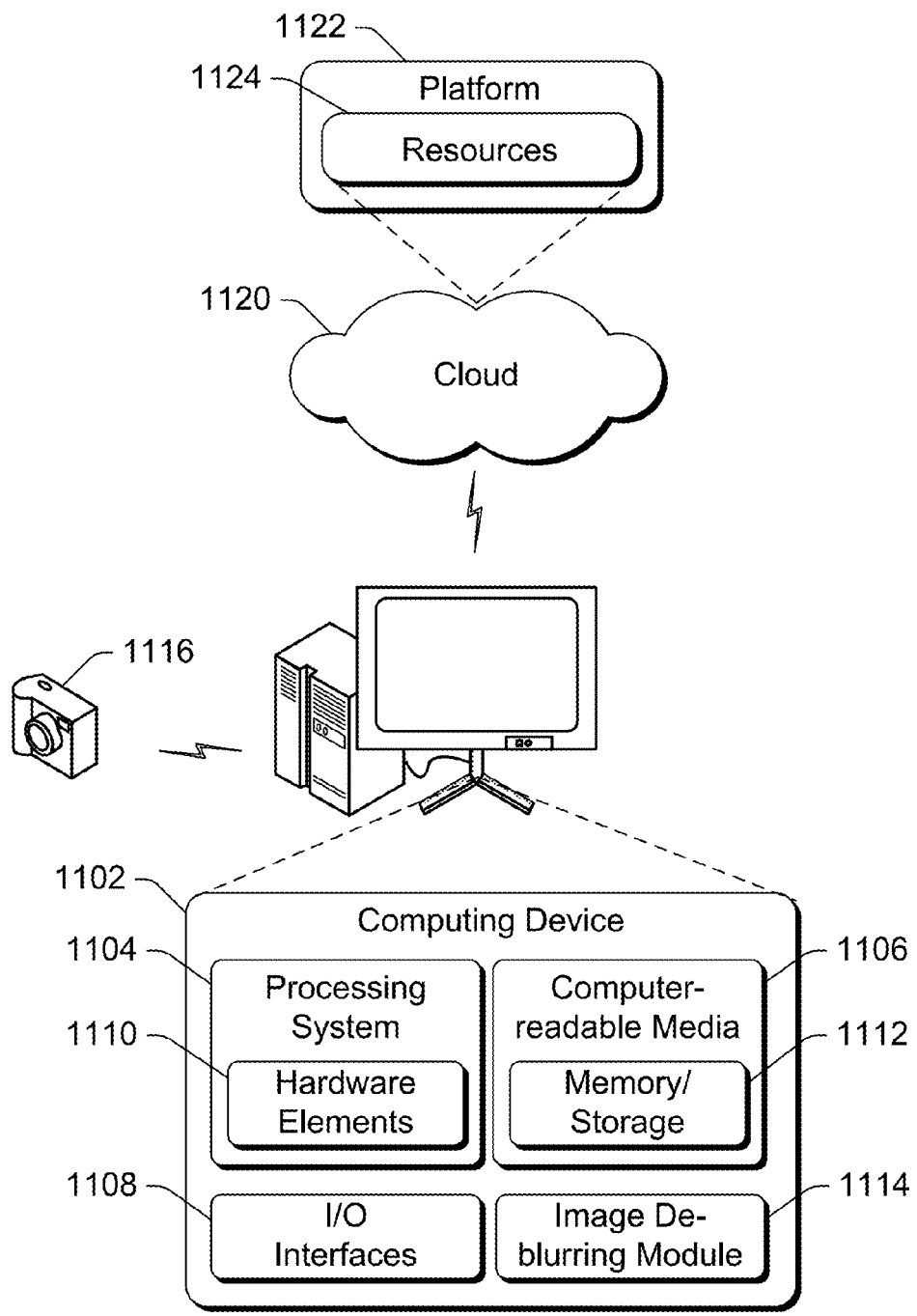
FIG. 11 illustrates an example system that includes an example computing device that is representative of one or more computing systems and/or devices that may implement the various techniques described herein.

FIG. 11 illustrates an example system generally at 1100 that includes an example computing device 1102 that is representative of one or more computing systems and/or devices that may implement the various techniques described herein. This is illustrated through inclusion of the image de-blurring module 1114, which may be configured to reduce the blur present in images, such as an image captured by an image capture device 1116. Image de-blurring module 1114 can be, for example, a data-driven and edge-based image de-blurring system 102 of FIG. 1, or an image de-blurring system 200 of FIG. 2. Computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1106 is illustrated as including memory/storage 1112. Memory/storage 1112 represents memory/storage capacity associated with one or more computer-readable media. Memory/storage component 1112 may include volatile media (such as random access memory (RAM)) and/or nonvolatile media (such as read only memory (ROM), Flash memory, optical disks, magnetic disks, and so forth). Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. Computing device 1102 may be configured to implement particular instructions and/or functions corresponding to the software and/or hardware modules. Accordingly, implementation of a module that is executable by computing device 1102 as software may be achieved at least partially in hardware, e.g., through use of computer-readable storage media and/or hardware elements 1110 of processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1120 via a platform 1122 as described below.

Cloud 1120 includes and/or is representative of a platform 1122 for resources 1124. Platform 1122 abstracts underlying functionality of hardware (e.g., servers) and software resources of cloud 1120. Resources 1124 may include applications and/or data that can be utilized while computer processing is executed on servers that are remote from computing device 1102. Resources 1124 can also include services provided over the Internet and/or through a subscriber network, such as a cellular or Wi-Fi network.

Platform 1122 may abstract resources and functions to connect computing device 1102 with other computing devices. Platform 1122 may also serve to abstract scaling of resources to provide a corresponding level of scale to encountered demand for resources 1124 that are implemented via platform 1122. Accordingly, in an interconnected device embodiment, implementation of functionality described herein may be distributed throughout system 1100. For example, the functionality may be implemented in part on computing device 1102 as well as via platform 1122 that abstracts the functionality of the cloud 1120.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating a de-blurred version of an input image, the method comprising:
   obtaining, by a computing device, the input image having multiple patches, each patch comprising multiple pixels;
   on a first of multiple iterations, the computing device:
   extracting edges from the input image,
   identifying, for each of the multiple patches in the input image, a sharp patch corresponding to the patch, the sharp patch including a sharp edge and being one of multiple sharp patches in a sharp patch library,
   generating, based on the identified sharp patches, a predicted sharp version of the input image,
   generating an estimated blur kernel based on the predicted sharp version of the input image, and
   generating an intermediate sharpened image based on the input image and the estimated blur kernel; and
   on subsequent iterations of the multiple iterations, the computing device:
   extracting edges from an intermediate sharpened image generated in a previous iteration of the multiple iterations the intermediate sharpened image having multiple patches,
   identifying, for each of the multiple patches in the intermediate sharpened image, a sharp patch from the sharp patch library corresponding to the patch of the intermediate sharpened image,
   generating, based on the sharp patches identified in the current iteration of the multiple iterations, a predicted sharp version of the input image for the current iteration, the de-blurred version of the input image being generated from the predicted sharp version of the input image for a last of the multiple iterations, generating an estimated blur kernel for the current iteration based on the predicted sharp version of the input image for the current iteration, and generating, based on the intermediate sharpened image for the previous iteration of the multiple iterations and the estimated blur kernel for the current iteration, an intermediate sharpened image for the current iteration.

2. A method as recited in claim 1, the identifying, for each of the multiple patches in the input image, a sharp patch corresponding to the patch comprising identifying, as the sharp patch corresponding to each of the multiple patches, one of the multiple sharp patches that includes an edge that is at least approximately the same as an edge in the patch of the input image.

3. A method as recited in claim 1, each identifying comprising identifying a sharp patch that is one of multiple sharp patches with synthetically generated sharp edges in the sharp patch library.

4. A method as recited in claim 1, each identifying comprising identifying a sharp patch that is one of multiple sharp patches with natural sharp edges in the sharp patch library.

5. A method as recited in claim 1, the generating the predicted sharp version of the input image comprising modifying edges in the input image to be similar to sharp edges in the sharp patches from the sharp patch library.

6. A method as recited in claim 5, the generating the predicted sharp version of the input image comprising keeping a contrast distribution in the predicted sharp version consistent with a contrast distribution of a set of known images.

7. One or more computer-readable storage media having stored thereon multiple instructions that, when executed by one or more processors of a computing device, cause the one or more processors to:

obtain an input image;

in a first of multiple iterations:

extract edges from the input image, generate, based on sharp patches corresponding to patches of the input image, a predicted sharp version of the input image, the sharp patches being included in a sharp patch library, each sharp patch comprising multiple pixels, and generate, based on the predicted sharp version of the input image, an estimated blur kernel, and generate an intermediate sharpened image based on the input image and the estimated blur kernel; and in subsequent iterations of the multiple iterations:

extract edges from an intermediate sharpened image generated in a previous iteration of the multiple iterations, generate, based on sharp patches identified in the current iteration of the multiple iterations, a predicted sharp version of the input image for the current iteration, generate, as the blur kernel, an estimated blur kernel for the current iteration based on the predicted sharp version of the input image for the current iteration, and generate, based on the intermediate sharpened image for the previous iteration of the multiple iterations and the estimated blur kernel for the current iteration, an intermediate sharpened image for the current iteration if the current iteration is an iteration other than a last iteration of the multiple iterations, and the a sharpened version of the image if the current iteration is the last of the multiple iterations.

8. One or more computer-readable storage media as recited in claim 7, wherein to generate the predicted sharp version of the input image is to identify, as each of the sharp patches, one of multiple sharp patches in the sharp patch library that includes an edge that is at least approximately the same as an edge in the patch of the input image.

9. One or more computer-readable storage media as recited in claim 7, wherein to generate the predicted sharp version of the input image is to generate the predicted sharp version of the input image based on sharp patches with synthetically generated sharp edges in the sharp patch library.

10. One or more computer-readable storage media as recited in claim 7, wherein to generate the predicted sharp version of the input image is to generate the predicted sharp version of the input image based on sharp patches with natural sharp edges in the sharp patch library.

11. One or more computer-readable storage media as recited in claim 7, wherein to generate the predicted sharp version of the input image is to generate the predicted sharp version of the image based on modifying edges in the input image to be similar to sharp edges in the sharp patches from the sharp patch library.

12. One or more computer-readable storage media as recited in claim 11, wherein to generate the predicted sharp version of the input image is further to generate the predicted sharp version of the input image based on keeping a contrast distribution in the predicted sharp version consistent with a contrast distribution of a set of known images.

13. A system comprising:

an image access module of a computing device, the image access module being configured to obtain an input image;

a sharp patch library including multiple sharp patches, each sharp patch including an edge;

a sharp image predication module of the computing device, the sharp image prediction module being configured to generate, based on ones of the multiple sharp patches corresponding to patches of an image, a predicted sharp version of the image;

a blur kernel generation module of the computing device, the blur kernel generation module being configured to generate, based on the predicted sharp version of the image, a blur kernel;

the sharp image prediction module and the blur kernel generation module being further configured to, in each of multiple iterations:

extract edges from an image, the image having multiple patches, the image comprising the input image in a first of the multiple iterations, and the image comprising an intermediate sharpened image generated in a previous iteration for subsequent iterations, identify, for each of the multiple patches in the image, a sharp patch from the sharp patch library corresponding to the patch of the image, generate, based on the sharp patches identified in the current iteration of the multiple iterations, a predicted sharp version of the image for the current iteration, the de-blurred version of the image being generated from the predicted sharp version of the image for a last of the multiple iterations, generate an estimated blur kernel for the current iteration based on the predicted sharp version of the image for the current iteration, and generate, based on the estimated blur kernel for the current iteration as well as the input image in the first iteration and the intermediate sharpened image in the previous iteration for subsequent iterations, an intermediate sharpened image for the current iteration.

14. A system as recited in claim 13, the multiple sharp patches comprising patches with synthetically generated sharp edges.

15. A system as recited in claim 13, the predicted sharp version of the image for the current iteration being based on modifying edges in the image to be similar to sharp edges in the sharp patches from the sharp patch library.

16. A system as recited in claim 13, the predicted sharp version of the image for the current iteration being generated based on keeping a contrast distribution in the predicted sharp version consistent with a contrast distribution of a set of known images.

17. A system as recited in claim 13, the identified sharp patch being one of the multiple sharp patches in the sharp patch library that includes an edge that is at least approximately the same as an edge in the patch of the image.

18. A system as recited in claim 13, the multiple sharp patches comprising patches with natural sharp edges.

19. A method as recited in claim 1, the multiple iterations comprising five or seven iterations.

20. A method as recited in claim 1, the multiple iterations comprising a number of iterations that increases until a difference between the estimated blur kernel in consecutive iterations is less than a threshold amount.

* * * * *